Feb. 11, 1958  E. P. TURNER  2,822,903
ELECTRIC CLUTCH-BRAKE DRIVING DEVICES
Filed May 1, 1952  6 Sheets-Sheet 1

WITNESS:

INVENTOR.
Edgar P. Turner
BY
ATTORNEY

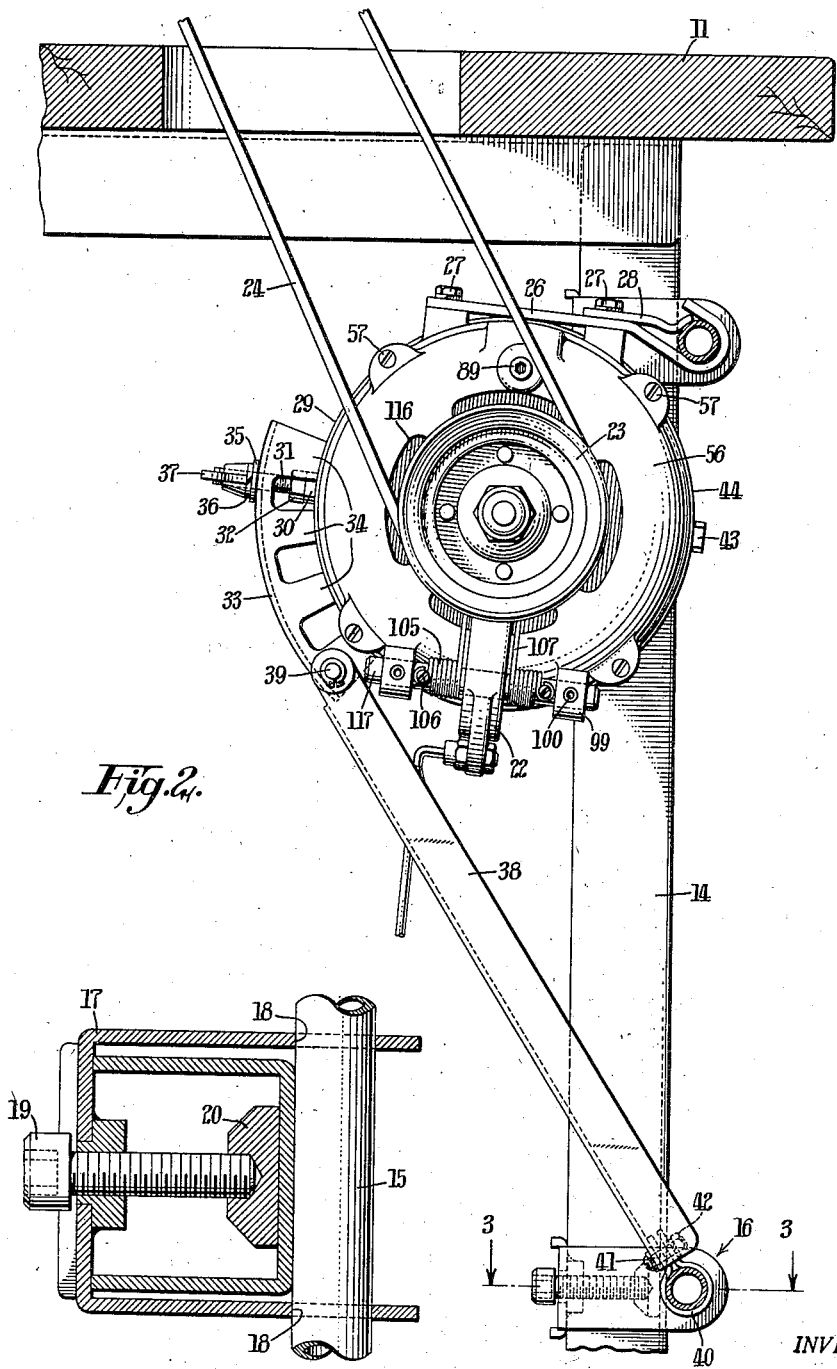

Feb. 11, 1958      E. P. TURNER      2,822,903

ELECTRIC CLUTCH-BRAKE DRIVING DEVICES

Filed May 1, 1952      6 Sheets-Sheet 3

INVENTOR.
Edgar P. Turner

WITNESS:      BY
William Martins      William P. Stewart
     ATTORNEY

Feb. 11, 1958 E. P. TURNER 2,822,903
ELECTRIC CLUTCH-BRAKE DRIVING DEVICES
Filed May 1, 1952 6 Sheets-Sheet 5

WITNESS=
William Martin

INVENTOR.
Edgar P. Turner
BY
William P. Stewart
ATTORNEY

Feb. 11, 1958 E. P. TURNER 2,822,903
ELECTRIC CLUTCH-BRAKE DRIVING DEVICES
Filed May 1, 1952 6 Sheets-Sheet 6

WITNESS:
William Martins

INVENTOR.
Edgar P. Turner
BY
William P. Stewart
ATTORNEY

United States Patent Office 2,822,903
Patented Feb. 11, 1958

2,822,903

ELECTRIC CLUTCH-BRAKE DRIVING DEVICES

Edgar P. Turner, Fanwood, N. J., assignor to The Singer Manufacturing Company, Elizabeth, N. J., a corporation of New Jersey Application May 1, 1952, Serial No. 285,504

12 Claims. (Cl. 192—18)

This invention relates to an electric clutch-brake driving device or transmitter and has for an object to provide an electric transmitter with an air-cooled clutch and brake mechanism.

Another object of the invention is to provide a clutch and brake mechanism which can be readily adjusted and serviced.

A further object of the invention is to provide a friction clutch and brake mechanism which will operate smoothly and quietly.

Another object of the invention is to provide a clutch and brake control mechanism which is long-wearing and smooth in operation.

Yet another object of the invention is to provide a clutch and brake mechanism which can be removed and replaced as a complete unit.

In the drawings,

Fig. 2 is an enlarged right end view, partly in section, of the transmitter and supporting structure as shown in Fig. 1.

Fig. 3 is a sectional view taken on line 3—3 of Fig. 2.

Figure 4:
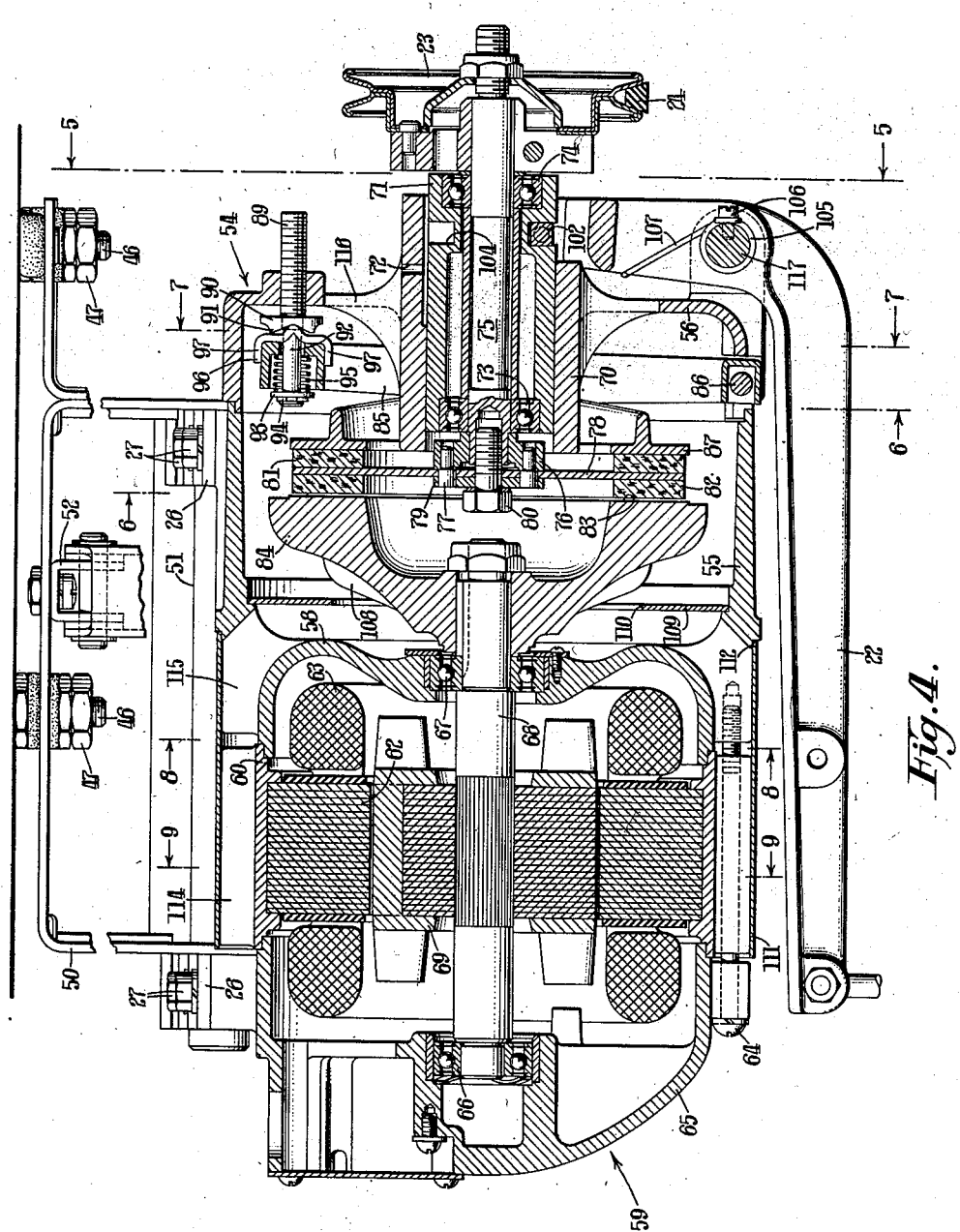
Fig. 4 is an enlarged sectional view taken substantially through the center of the transmitter showing a modified mounting structure.

Figs. 5, 6, 7, 8 and 9 are sectional views taken substantially on lines 5—5, 6—6, 7—7, 8—8 and 9—9, respectively, of Fig. 4.

Referring more specifically to the drawings, a conventional sewing machine 10 is shown mounted on a supporting table top 11 in the usual manner. Two supporting legs 12 carry the table top 11 and a treadle supporting tube 13. Each supporting leg 12 includes a vertical channel member 14 which serves as the rear support member in each leg 12, as best shown in Fig. 2. The channel members 14 support upper and lower horizontal tubes 15 which are secured to the channel members 14 by special clamps 16, one of which is shown in detail in Fig. 3. Each clamp comprises a U-shaped member 17 having arms which are longer than the cross-sectional depth of the channel member 14. One of the tubes 15 passes through tube receiving apertures 18 formed in the ends of the arms of the member 17 behind the channel member 14. A clamping screw 19 is threaded through the bottom of the U-shaped member 17 and carries a clamping block 20 which is engageable with the bottom web of the channel member. It is apparent that upon tightening of the clamping screw 19, the clamping block 20 will engage the channel member 14 and the tube 15 will be drawn firmly against the channel member 14, thus holding the tube 15 securely against vertical and horizontal movement relative to the channel member 14.

The structure described above forms a supporting frame for a transmitter or clutch brake driving device 21 provided with an actuating lever 22 and a driven pulley 23. A belt 24 connects the pulley to a driving pulley 25 on the sewing machine 10. The transmitter 21 may be of the type disclosed in the copending U. S. patent applications of H. B. Fuge, Serial No. 285,492, filed on May 1, 1952, now Patent No. 2,771,973, and R. D. Ingalls, Serial No. 285,441, filed on May 1, 1952, now Patent No. 2,739,251. Two support plates 26 are fastened to the transmitter 21 by screws 27 and are provided with curved end portions which engage the upper horizontal tube 15. A lock plate 28 associated with each support plate 26 is also fastened to the transmitter by the screws 27 and extends rearwardly to engage the upper horizontal tube 15 and clamp it securely in the curved end portion of the associated support plate 26. The surface of the transmitter is provided with a smooth cylindrical portion 29 broken by a boss 30 which extends radially outwardly from the cylindrical surface portion 29. A stud 31 is threaded into the boss and is held in place by a lock-nut 32. The stud extends radially outwardly from the cylindrical surface of the transmitter 22 through a slot provided in a curved adjusting member 33. The adjusting member 33 is provided with a plurality of substantially radially extending fingers 34 the inner ends of which are formed to fit the curvature of the cylindrical portion 29 of the transmitter 21. A curved line drawn through the curved surfaces formed on the ends of the fingers 34 forms an arc of a circle having a radius substantially the same as the radius of the cylindrical surface portion 29. A washer 35, lock washer 36, and a wing nut 37 threaded on the stud 31 hold the adjusting member in the desired position. One end of a connecting link 38 is pivotally connected to the adjusting member 33 by a pivot pin 39. A strap 40 wrapped around the lower horizontal tube 15 is fastened to the lower end of the link 38 by a screw 41 and a nut 42. The adjusting member 33 and the connecting link 38 form an adjustable link connection between the transmitter and the lower tube 15.

In a sewing machine supporting table it is frequently necessary to change the machine supporting table top in order to accommodate different sizes of sewing machines. Of course, it is desirable that this may be accomplished with a minimum amount of effort and inconvenience. In tables of the type in which the transmitter is supported by the table-top, it must be removed when the top is removed, resulting in considerable labor and inconvenience. In the present table, the transmitter is supported on the horizontal tubes 15 of the table frame independently of the table top. This construction permits the top 11 to be removed without disturbing the transmitter mounting. In the event that a table top 11 and sewing machine 10 are replaced by a new top 11 and machine 10 which are mounted so that the pulley 25 is not alined with the transmitter pulley 23, it is only necessary to loosen the screws 27 holding the lock plates and the screw 41 at the end of the link 38. This permits the entire transmitter 21 to be moved parallel to the tubes 15 until the pulleys are again alined, at which time the screws 27 and 41 are tightened to hold the transmitter in place. In any position of the transmitter on the tubes 15, the tension of the belt 24 is readily adjusted by loosening the wing nut 37 and moving the transmitter 21 about the upper tube 15 as a pivot. When the desired belt tension is obtained, the nut 37 is tightened. By providing an extended bearing surface between the adjusting member 33 and the surface 29 of the transmitter, an excellent clamping action is obtained. Further, it should be noted that in the event that sufficient adjustment cannot be obtained in the adjusting member 33, the tubes 15 can be moved up or down along the channel members 14 upon loosening the clamps 16 until a suitable position is reached where the required belt tension adjustment can be obtained in the adjusting member 33. This feature permits the use of a wide range of machines and belt lengths.

Figure 1:
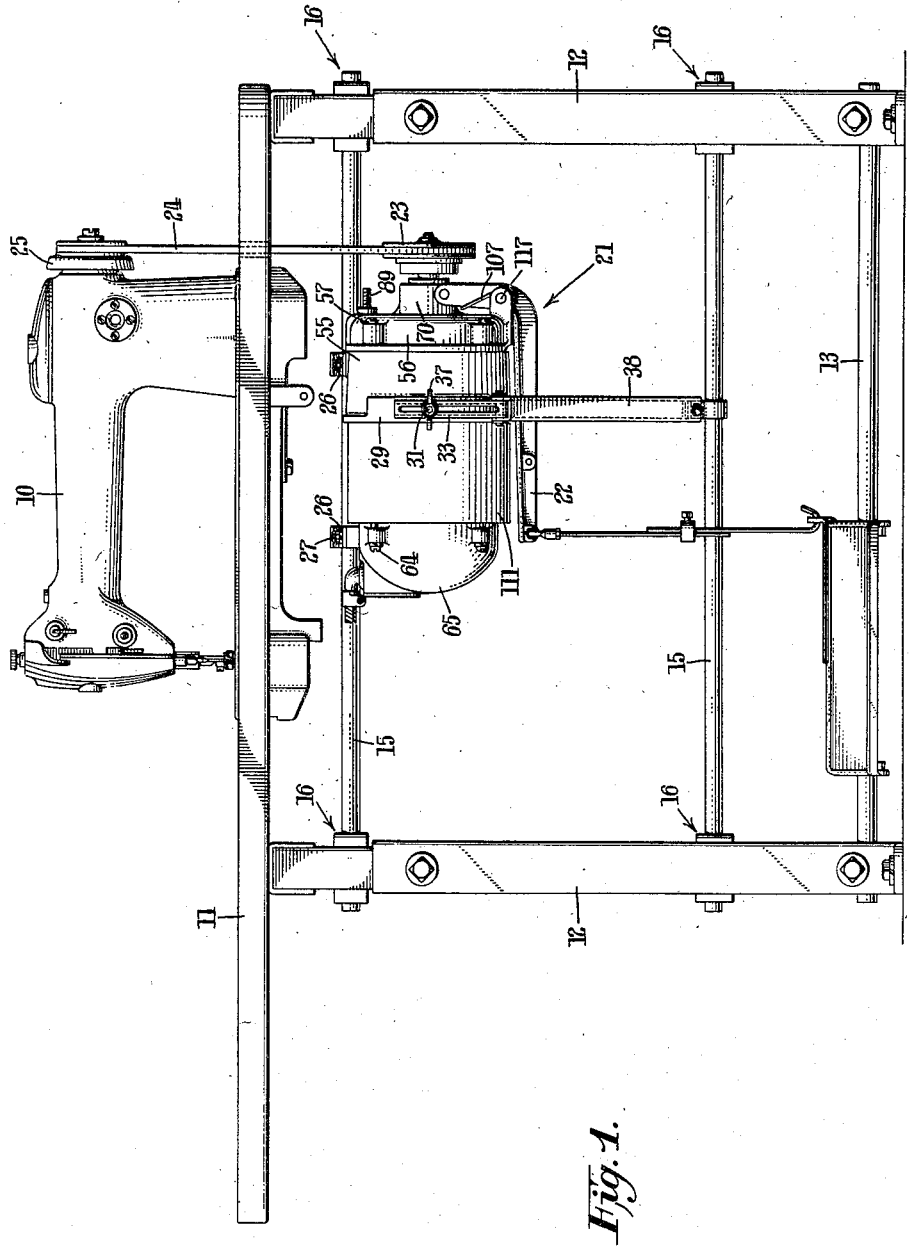
Fig. 1 is a front elevational view of a table supporting a sewing machine and a transmitter embodying my invention.

Provision has also been made in this device for mounting the transmitter either in the position shown in Fig. 1 or in a reversed position with the pulley 23 at the left end of the table top 11, as viewed in Fig. 1. A second tapped boss 43 and cylindrical surface portion 44 are provided on the transmitter 21 approximately diametrically opposite to the boss 30. When it is desired to mount the transmitter 22 in the reveresd position, the stud 31 is removed from the boss 30 and inserted in the boss 43. The support plates 26 are reversed so that the curved portion extends over the side of the transmitter carrying the boss 30. With these simple adjustments made, the support plates 26 are again secured to the upper tube 15 and the adjusting member 33 is clamped over the stud 31 as previously described. In this reversed position, the transmitter functions as before and all adjustments can be made as described above.

One important feature of this device is the vibration dampening effect of the tube mounting for the transmitter 22. The tubes 15 are relatively long and flexible. Since the transmitter 22 is fastened only to the tubes 15, most of the vibration of the transmitter is absorbed by the tubes 15 and is not transmitted to the legs 12 and table top 11. In transmitter supports wherein the support is fastened directly to the table top which is usually made of hard wood, the table top forms a very effective sounding board tending to amplify any vibration noise produced in the transmitter. In my preferred construction, any transmitter vibrations are practically completely dampened by the tubes 15.

Figure 5:
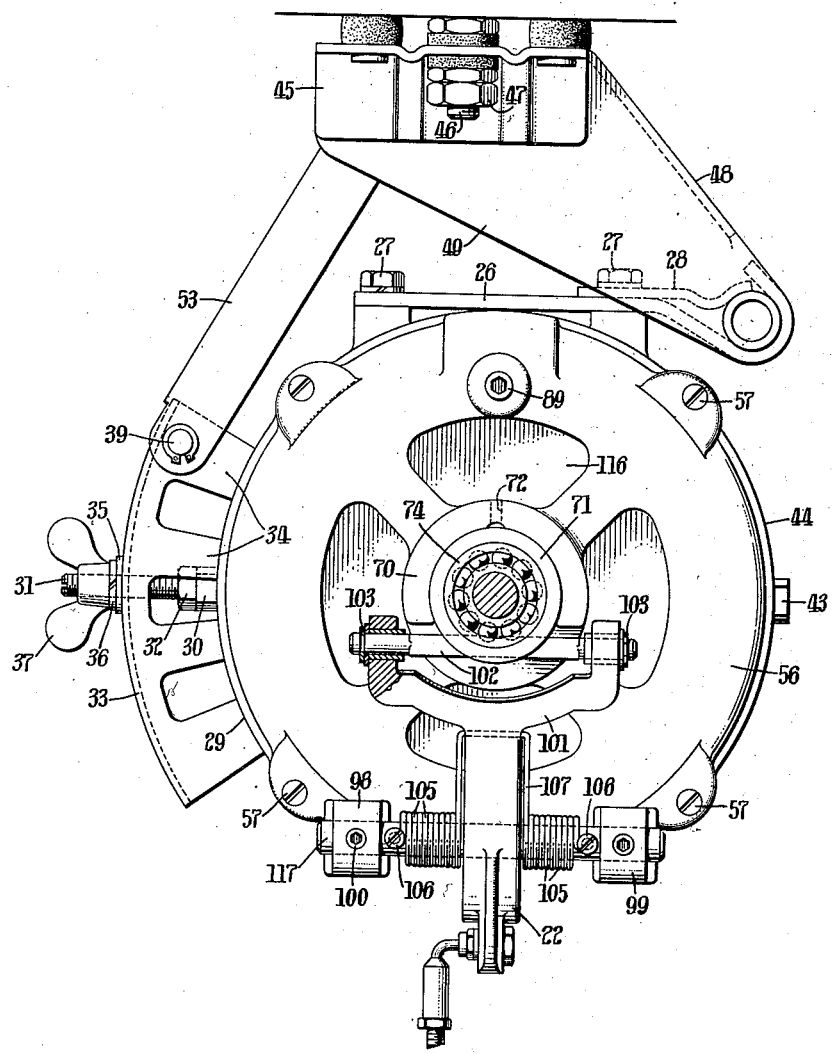
Figure 6:
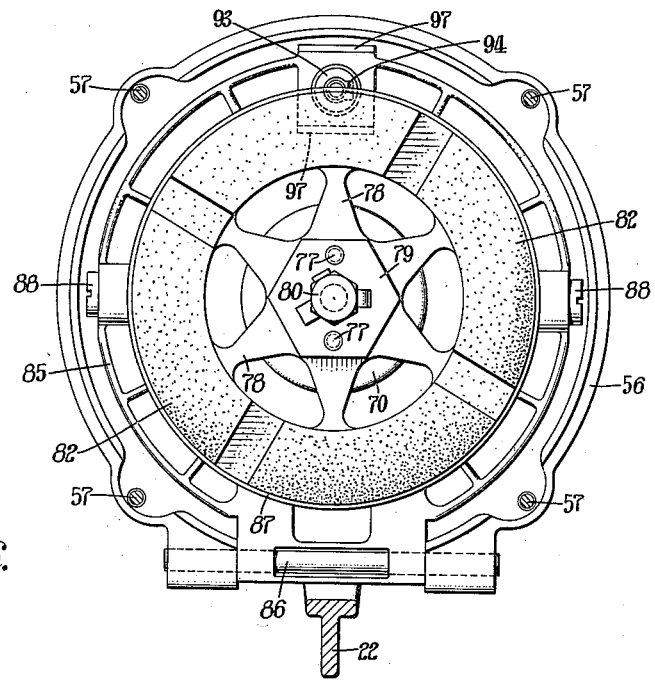
Figure 7:
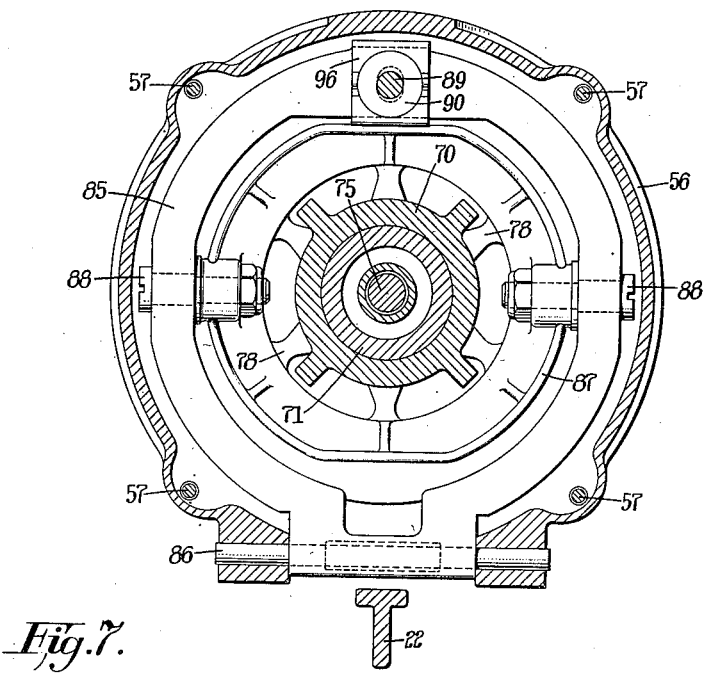
Figure 8:
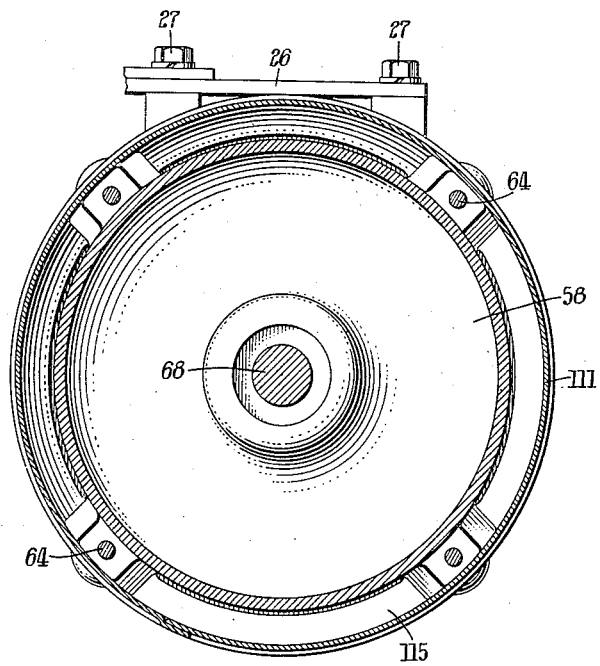
Figure 9:
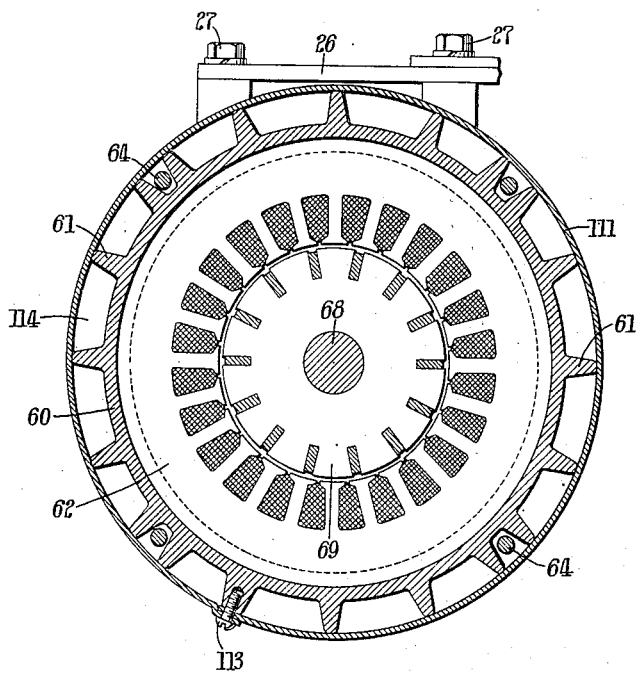

A modified mounting bracket shown in Figs. 4 and 5 may be used with the transmitter in the event that it is desired to fasten the transmitter to a table top. Many of the parts used in this form of mounting are the same as those used in the form of mounting shown in Figs. 1 and 2 and have been identified by the same numerals. In this form of mounting, a support bracket or frame 45 is fastened directly to the table top 11 by bolts 46 and nuts 47. The bracket 45 is provided with a downwardly and rearwardly extending portion 48 having depending side flanges 49 and 50. A support tube 51 is carried by the flanges 49 and 50 and extends beyond the left side of the bracket 45, as viewed in Fig. 4. The support plates 26 and lock plates 28 which engaged the upper tube 15 in the first modification engage the tube 51 in a similar manner. A pivot bracket 52 is fastened to the support bracket 45 and pivotally carries a short connecting link 53. The lower end of the short connecting link 53 is pivotally fastened to the adjusting member 33 by the pivot pin 39.

This construction provides the same convenient belt tension adjustment which is provided in the primary modification and also provides the same secure clamping action between the adjusting member 33 and the transmitter 21. In both constructions it is only necessary to loosen the wing nut 37 and move the transmitter about the upper tube 15 for all ordinary belt tension adjustments. In addition, the simplified construction of both support structures permits a transmitter equipped for one type of mounting to be readily converted to the other type of mounting with only a minimum number of parts to be changed.

The transmiter 21 is specially constructed to permit cooling of both the electric driving motor and the transmitter clutch and brake mechanism. A casing 54, comprising a cylindrical body portion 55 and a removable end cap 56 secured thereto by screws 57, is partially closed at one end by an integral web 58. The web 58 is formed to serve as an end closure for the casing 54 and also as a motor end closure bell for a driving motor 59 and carries a stator frame 60 provided with longitudinally disposed cooling ribs 61. The stator frame 60 carries stator laminations 62 and a stator winding 63. Long screws 64 hold a rear motor end closure 65 in place against the stator frame 60 and also secure the stator frame 60 in place on the web 58. An anti-friction bearing 66 carried by the end closure and a sealed type anti-friction bearing 67 carried by the web 58 rotatably support a motor rotor shaft 68 which extends into the casing 54. The rotor shaft 68 carries a motor rotor 69 of a conventional type. This construction provides a motor housing which is totally enclosed and sealed against dirt. Further, it should be noted that the end closure 65 is attached to one of the mounting plates 26 and the cylindrical housing portion 55 is attached to the other mounting plate 26. This provides a secure support for the transmitter and also allows the end cap 56 to be removed without affecting the transmitter support.

The end cap 56 of the casing 54 is formed with a central tubular support bearing 70 which slidably and rotatably carries a control sleeve 71. An oil hole 72 in the bearing 70 provides means for lubricating the sleeve 71. Two spaced ball bearings 73 and 74 are fitted into the bore of the sleeve 71 and carry a driven shaft 75 which is rotatable relative to the sleeve 71 and slidable with the sleeve. The outer end of the driven shaft 75 carries the driven pulley assembly 23. The inner end of the driven shaft carries a hub 76 which is pressed on the shaft 75. Two locating pins 77 are pressed into holes in the hub 76 and carry a flexible disc 78 and a washer 79. A securing screw 80 extends through the washer 79 and disc 78 and is threaded into the end of the driven shaft 75 to hold the disc 78 in place. The disc 78 carries a brake facing ring 81 of friction material on one side and a clutch facing ring 82 of friction material on the other side. The disc is approximately 6 inches in diameter and is made from stiff spring-like material which will permit the disc 78 to deflect aproximately 0.015" at its center when the outer edge is rigidly supported and a load of 60 lbs. is applied at the center of the disc. The clutch facing 82 is engageable with a clutch face 83 formed on an imperforate cup-shaped flywheel 84 which is fastened to the motor rotor shaft 68 extending into the casing 54. The central portion of the disc 78 is formed as a series of tapered leaf springs 85 having a wide base portion adjacent the center of the disc to reduce the possibility of fatigue fractures.

A brake supporting and adjusting lever or ring 85 is pivotally fastened to the end cap 56 by a pivot pin 86. A brake ring 87 is pivotally supported on gimbal pins 88 carried by the supporting ring 85 spaced approximately 90 degrees from the pivot pin 86 and is engageable by the brake facing 81. A brake adjusting device carried by the end cap 56 is fastened to the brake adjusting ring 85 approximately opposite to the pivot pin 86 in a manner similar to that disclosed in the copending application of H. B. Fuge, Serial No. 210,954, filed Feb. 14, 1951, now Patent No. 2,735,524. The adjusting mechanism consists of an adjusting screw 89 threaded through the end cap 56 and provided with a pronged head portion 90 formed with prongs 91 on one face. An extension rod 92 formed integral with the screw 89 extends through a hole in the adjusting ring 85 and carries a stop washer 93 held in place by a spring ring 94 forming an abutment for a spring 95. The coil compression spring 95 encircles the extension rod 92 and engages the stop washer 93 and the adjusting ring 85 to urge the adjusting ring toward the head portion 90. A ridged cap 96 is seated on the adjusting ring 85 and is held against rotation by flanges 97 formed on the cap. The ridge on the cap 96 is yieldingly held in engagement with the pronged head portion 90 by the spring 95 and normally rests in the depression between the prongs 91. Rotation of the adjusting screw 89 will cause the prongs 91 to ride over the ridge on the cap 96 at the same time causing the ring 85 to move about the pivot pin 86. When the screw 89 is turned to move the adjusting ring 85 counterclockwise about the pivot pin 86, as viewed in Fig. 4, the brake ring 87 is moved closer to the clutch surface 83 on the flywheel 84. As the brake ring 87 moves closer to the flywheel 84, it carries the disc 78 along until finally the clutch facing 82 and clutch surface 83 and the brake ring 87 and brake facing 81 are, respectively, in engagement. In order to obtain the correct adjustment, the adjusting screw is then backed off until the ridge is seated in the depression between the prongs 91. Thus the prongs serve as feelers which assure the proper clearance between the friction surfaces which will be a total distance which is slightly less than the height of the prongs.

The clutch and brake mechanism is controlled by the L-shaped actuating lever 22 which is pivotally supported on a pin 117 carried in bosses 98 and 99 formed on the end cap 56. Set screws 100 hold the pin 117 against rotation. A yoke 101 formed on one end of the lever 22 rotatably carries a control pin 102 which is held in place by spring rings 103. The pin 102 passes below the driven shaft 75 through a circumferential groove 104 formed in the control sleeve 71. A coil spring 105 is wrapped around the pin 117 and has both ends fastened to the pin by screws 106. A center loop 107 of the spring engages the lever 22 to urge it clockwise about the pin 117, as viewed in Fig. 4, to normally hold the brake facing 81 in engagement with the brake ring 87.

In order to circulate cooling air over the device, a series of fan blades 108 is formed on the rear of the flywheel 84 adjacent the web 58. An annular baffle ring 109 carried by the casing portion 55 is disposed between the web 58 and the fan blades 108 and is provided with a central opening 110. A cylindrical shroud 111 of sheet material is supported on the ribs 61 and engages a shoulder 112 formed on the casing portion 55. The shroud is held in place by a screw 113 threaded into one of the ribs 61 on the stator frame 60. When the shroud is secured in place, the spaces 114 between the ribs 61 form air passages leading to air inlet openings 115 in the casing web 58. Air outlet openings 116 are formed in the casing end cap 56 to permit warm air to escape from the casing.

In view of the above description, it is believed that the operation and advantages of this device will now be readily understood. In previous transmitters of this type, cooling air is usually forced directly through the motor in order to cool the motor. Of course, in such a construction, quantities of dirt soon accumulate in the motor bearings and windings which causes undesirable wear and heating. A few constructions have embodied a totally enclosed motor in a transmitter but have then forced air over the motor which has already passed over the heated clutch and brake surfaces, resulting in inadequate cooling of the motor. In my construction, when the motor windings 63 are energized and the shaft 68 rotates, the fan blades 108 on the flywheel 84 force cooling air to flow through the air passages from left to right, as viewed in Fig. 4. The baffle ring 109 causes the fan blades 108 to function as the blades of a centrifugal type fan which draws air through the central opening 110 in the ring 109 and forces it radially outwardly over the rear surface of the flywheel. This centrifugal fan action causes cool air to be drawn in through the air passages 114 to cool the motor 59. The air is then forced through the casing 54 to cool the friction surfaces of the clutch and brake mechanism and is finally exhausted through the outlet openings 116. This direction of air flow causes the cooling air to pass over the totally enclosed motor first, where the cooling effect is most needed, and then over the clutch and brake surfaces, which require less cooling. Of course, it is readily apparent that in my construction the air passages can be easily cleaned by merely removing the shroud 111 and cleaning any accumulated dirt from the ribs 61.

An important feature of the device is the arrangement whereby the entire clutch and brake mechanism can be removed as an assembled unit for cleaning and other servicing upon removal of the end cap 56. When the end cap 56 is removed from the casing portion 55, the driven shaft 75, disc 78, the actuating lever 22, and the brake ring 87 are all removed with the end cap 56 but remain in their relative assembled relationships. With the end cap 56 removed, the flywheel 84, casing portion 55, and the clutch and brake mechanism can be easily cleaned. Provided no other adjustments or replacements are made other than cleaning, upon replacing the end cap 56 on the casing portion 55, all of the parts are in their original relative positions and no adjustment of the clutch and brake mechanism is necessary. However, in the event that some parts, such as the disc 78, must be replaced, the replacement can be readily made with the end cap 56 removed. Further, it should be noted that the screws 57 are equally spaced around the end cap 56 in order that the cap 56 can be attached to the housing 55 in any one of four positions.

In previous transmitters of this type engagement of the clutch or brake is often accompanied by an objectionable "grunting" or "squealing" noise. This noise is frequently due to mis-alignment of the engaging friction surfaces. The present device effectively eliminates all "grunts" and "squeals" and provides a quiet, smooth operating transmitter. It has been determined that frequently, misalignment of the friction surfaces is the result of bending or misalignment of the driven shaft 75. Obviously a considerable lateral thrust is placed on the outer end of the shaft 75 at the pulley assembly 23, which thrust is occasioned by the load of the driven sewing machine 10. In the instant device, the lateral thrust applied by the machine 10 is applied substantially upwardly, as viewed in Figs. 1, 2 and 4. This lateral force tends to tilt the shaft 75 and the sleeve 71 relative to the support bearing 70 and also causes the shaft 75 to bend slightly. In the present device, the ill effects of the lateral thrust have been overcome by providing the flexible disc 78 and by placing the control pin 102 below the driven shaft 75. By locating the control pin 102 below the shaft 75, a clockwise force is placed on the sleeve 71, as viewed in Fig. 4, when the actuating lever 22 is moved to engage the clutch facing 82 with the flywheel 84, which counteracts the counterclockwise force of the machine 10. This tends to maintain the axis of the sleeve coincident with the axis of the support bearing 70, thus eliminating most of the misalignment of the shaft 75 and the resulting misalignment of the disc 78 and its friction facings 81 and 82. The flexible disc 78 compensates for any slight bending in the shaft 75. However, the amount of deflection of the disc 78 under a given load must be within the limits described above. If the disc flexes too much, the friction facings 81 and 82 are deformed and tend to become cone-shaped, which results in noisy operation and excessive wear. Of course, if the disc 78 is too rigid, the desired flexing is not obtained and the disc will not compensate for slight misalignments of the friction facings 81 and 82. A disc having the specifications described above has been found to operate satisfactorily.

A further advantage results from placing the control pin 102 below the shaft 75. As described above, the lateral load placed on the end of the shaft tends to tilt the sleeve 71 in the bearing 70, resulting in binding of the sleeve in the bearing and little or no lubrication on the areas of greatest loading and wear. However, the force applied to the sleeve 71 through the pin 102 upon engagement of the clutch holds the sleeve 71 substantially concentric with the support bearing 70 permitting lubricating oil to flow evenly around the sleeve 70, resulting in greatly reduced wear. Further, since the pin 102 enters the circumferential groove 104 in the sleeve 71, the sleeve can rotate as a result of the small amount of torque transmitted through the bearings 73 and 74 from the driven shaft. The slow rotation of the sleeve 71 continually presents different, well lubricated surfaces at the areas of greatest load.

From the above description the advantages of my transmitter are readily apparent. The transmitter is a well ventilated power source for driving a machine. The transmitter can be readily serviced and adjusted without major disassembly. Further, quiet clutch and brake operation is obtained and long wear is obtained from the actuating parts.

Having thus set forth the nature of the invention, what I claim is:

1. An electric clutch-brake driving device comprising a housing, supporting means for said housing, an end cap for said housing, a support bearing carried by said end cap, a control sleeve journaled in said support bearing, a driven shaft journaled in said sleeve, an actuating lever pivotally carried by said end cap, a control pin carried by said lever and engaging said sleeve, a brake pivotally supported on said end cap, brake adjusting means carried only by said end cap, and means for securing said end cap to said housing in a plurality of positions.

2. An electric clutch-brake driving device comprising a housing, a removable end cap carried by said housing, a central supporting bearing carried by said end cap, a rotatable and axially movable control sleeve journaled in said bearing and having a groove formed in its outer wall, a rotatable driven shaft journaled in said sleeve, a friction disc carried by said driven shaft, an actuating lever pivotally fastened to said end cap, and a pin carried by said lever and extending into said groove.

3. An electric clutch-brake driving device comprising a clutch-brake housing, a removable end closure bell carried by said housing, removable fastening means securing said end closure bell to said housing, a brake supporting member pivotally fastened to said closure bell, a brake carried by said supporting member, an adjusting screw threaded through said end closure bell provided with a pronged head portion, a ridged member carried by said brake supporting member and engageable with said pronged head portion, and a yieldable connection between said adjusting screw and said supporting member urging said ridged member and pronged head portion into engagement.

4. An electric clutch-brake driving device comprising a housing, an end cap carried by said housing, a bearing carried by said end cap, a control sleeve journaled in said bearing, a driven shaft journaled in said control sleeve, a friction disc carried by said driven shaft, a brake element engageable by said disc, a brake support lever pivotally connected to said end cap and said brake element, an adjusting screw threaded into said end cap and having a pronged head portion, a ridged member carried by said support lever and engageable with said pronged head portion, and a spring interposed between said adjusting screw and said support lever yieldingly urging said ridged member and said pronged head portion into engagement.

5. An electric clutch-brake driving device comprising a casing, a brake element disposed in said casing, a control sleeve journaled in said casing, a driven element journally supported in said control sleeve, a brake support lever pivotally connected to said casing and said brake element, an adjusting screw threaded into said casing and having a pronged head portion, a ridged member carried by said support lever and engageable with said pronged head portion, a spring abutment carried by said adjusting screw, and a spring interposed between said abutment and said support lever urging said ridged member and said pronged head portion into engagement.

6. An electric clutch-brake driving device comprising a clutch-brake housing, a removable end closure bell carried by said housing, removable means fastening said closure bell to said housing, a brake pivotally fastened to said closure bell, a brake adjusting device carried by said end closure bell and operatively connected to said brake, a central bearing carried by said end closure bell, a rotatable sleeve journaled in said bearing and provided with a circumferential groove, a driven shaft rotatably supported in said sleeve, a flexible clutch disc fastened to one end of said driven shaft, an actuating lever pivotally fastened to said end closure bell, and a pin carried by said lever and entering the groove in said sleeve.

7. An electric clutch-brake driving device comprising a housing, an electric motor carried by said housing, a clutch brake mechanism disposed within said housing, a cylindrical bearing wall formed in said housing, a cylindrical control sleeve coaxial with and slidably carried within said cylindrical bearing wall, a driven shaft rotatably journaled in said sleeve operatively associated at one end with said clutch-brake mechanism, driven means connected to the other end of said driven shaft and applying a turning couple in one direction along the length of said driven shaft, and an actuating member connected to said control sleeve and applying a turning couple on said control sleeve in the opposite direction from the first mentioned turning couple.

8. An electric clutch-brake driving device comprising a housing, an electric motor carried by said housing, a clutch and brake mechanism disposed within said housing, a cylindrical bearing wall formed in said housing, a cylindrical sleeve coaxial with and slidably carried by said cylindrical bearing wall, a driven shaft rotatably journaled intermediate its ends in bearings carried by said sleeve, a connecting element carried on one end of said shaft adapted to be selectively engageable with said clutch or brake mechanism, driven means connected to the other end of said shaft applying a turning couple along the length of said shaft tending to tilt said shaft and thereby said cylindrical sleeve out of axial alignment with said cylindrical bearing wall, and an actuating member pivotally carried by said housing for axially sliding said cylindrical sleeve in said bearing wall to selectively position said connecting element in clutch or brake engagement, and pin means connecting said actuating member to said cylindrical sleeve applying a turning couple on said cylindrical sleeve in opposition to the first mentioned turning couple thereby to inhibit said shaft and cylindrical sleeve from tilting out of axial alignment with said cylindrical bearing wall.

9. An electric clutch-brake driving device comprising a housing, an electric motor carried by said housing, a clutch and brake mechanism disposed within said housing, a cylindrical bearing wall formed in said housing, a control sleeve coaxial with and slidably carried by said cylindrical bearing wall, a driven shaft rotatably journaled intermediate its ends in bearings carried by said sleeve, a connecting element carried on one end of said shaft adapted to be selectively engageable with said clutch or brake mechanism, driven means connected to the other end of said shaft applying a turning couple along the length of said shaft tending to tilt said shaft and thereby said cylindrical sleeve out of axial alignment with said cylindrical bearing wall, and an actuating member pivotally carried by said housing for axially sliding said control sleeve in said bearing wall to selectively position said connecting element in clutch or brake engagement, and pin means connecting said actuating member to said control sleeve, said pin means engaging said control sleeve intermediate the ends of said driven shaft and lying on one side of the axis of rotation thereof and applying a turning couple to said control sleeve in opposition to said first mentioned turning couple thereby to inhibit said shaft and cylindrical sleeve from tilting out of axial alignment with said cylindrical bearing wall.

10. An electric clutch-brake driving device comprising a housing, an electric motor carried by said housing, a clutch-brake mechanism disposed within said housing, a control sleeve slidably carried within said housing, said control sleeve being formed with a circumferential groove on the outer periphery thereof, a driven shaft rotatably journaled in said sleeve and operatively connected to said clutch-brake mechanism, an actuating lever pivotally connected to said housing for moving said control sleeve and said shaft selectively into clutch or brake position, and control pin means carried by said actuating lever slidably engageable within said circumferential groove permitting relative turning of said sleeve and actuating lever.

11. An electric clutch-brake driving device comprising an electric motor, a casing, a cylindrical control sleeve slidably carried by said casing, said control sleeve being formed with a circumferential groove on the outer periphery thereof, a driven shaft journaled in bearings carried by said sleeve, a clutch-brake mechanism disposed within said casing and operatively connected to said driven shaft, an actuating lever pivotally mounted on said casing for moving said sleeve and said driven shaft selectively into clutch or brake position, and control pin means carried by said actuating lever and entering into said circumferential groove of said control sleeve between the axis of rotation of said driven shaft and the outer periphery of said sleeve whereby said sleeve and said pin means may move relative to each other in a direction transverse to the longitudinal axis of said driven shaft.

12. An electric clutch-brake driving device comprising an electric motor, a casing, a cylindrical control sleeve slidably carried by said casing, said control sleeve being formed with a circumferential groove on the outer periphery thereof, a driven shaft journaled in bearings carried by said sleeve, a clutch-brake mechanism disposed within said casing and operatively connected to said driven shaft, an actuating lever pivotally mounted on said casing for moving said sleeve and said driven shaft selectively into clutch or brake position, and control pin means positioned transversely to the longitudinal axis of said driven shaft, said control pin means being carried by said actuating lever and engageable within said groove of said control sleeve between the axis of rotation of said driven shaft and the outer periphery of said sleeve whereby said sleeve and said pin means may move relative to each other in a direction transverse to the longitudinal axis of said driven shaft.

References Cited in the file of this patent
UNITED STATES PATENTS

| | | |
|---|---|---|
| 1,382,133 | Spencer et al. | June 21, 1921 |
| 1,734,935 | Zaccone | Nov. 5, 1929 |
| 1,855,533 | Tower | Apr. 26, 1932 |
| 2,021,124 | Laming | Nov. 12, 1935 |
| 2,037,644 | Voigt | Apr. 14, 1936 |
| 2,098,266 | Walker | Nov. 9, 1937 |
| 2,150,867 | Voigt | Mar. 14, 1939 |
| 2,454,471 | Momberg | Nov. 23, 1948 |
| 2,609,075 | Schulder | Sept. 2, 1952 |